United States Patent [19]

Deal

[11] 4,242,733

[45] Dec. 30, 1980

[54] IMAGE SPOT DETECTOR USING HAAR COEFFICIENTS

[75] Inventor: Bruce C. Deal, Santa Ana, Calif.

[73] Assignee: Northrop Corporation, Los Angeles, Calif.

[21] Appl. No.: 69,882

[22] Filed: Aug. 27, 1979

[51] Int. Cl.³ .................. H04N 7/12; G06F 15/332
[52] U.S. Cl. ............................ 364/515; 358/133; 358/260; 364/725
[58] Field of Search ............... 364/515, 725, 727; 358/133, 260; 340/146.3 T, 146.3 AC, 146.3 AE, 146.3 AQ, 146.3 MA

[56] References Cited

U.S. PATENT DOCUMENTS

| | | | |
|---|---|---|---|
| 3,576,980 | 5/1971 | Doyle | 364/700 |
| 3,846,752 | 11/1974 | Nakano et al. | 340/146.3 Q |
| 3,869,697 | 3/1975 | Kawasaki | 340/146.3 P |
| 3,976,826 | 8/1976 | Fullton, Jr. | 358/133 |
| 3,981,443 | 9/1976 | Lynch et al. | 364/715 |
| 4,005,385 | 1/1977 | Joynson et al. | 340/146.3 AE |
| 4,055,756 | 10/1977 | Jolivet et al. | 364/725 |
| 4,134,134 | 1/1979 | Lux | 358/133 |
| 4,179,709 | 12/1979 | Workman | 358/133 |
| 4,189,748 | 2/1980 | Reis | 358/133 |

Primary Examiner—Jerry Smith
Attorney, Agent, or Firm—Edward A. Sokolski

[57] ABSTRACT

A machine for detecting image spots in two-dimensional images. The machine transforms two-dimensional images by means of the Haar transform into the two-dimensional Haar transform domain and calculates a "double difference" between each Haar transform coefficient and the adjacent coefficients in the immediately preceding rows and columns. For certain of these "double differences" which are sensitive to spots, the invention outputs a spot indication and address whenever the absolute magnitude of the "double difference" exceeds a threshold.

2 Claims, 1 Drawing Figure

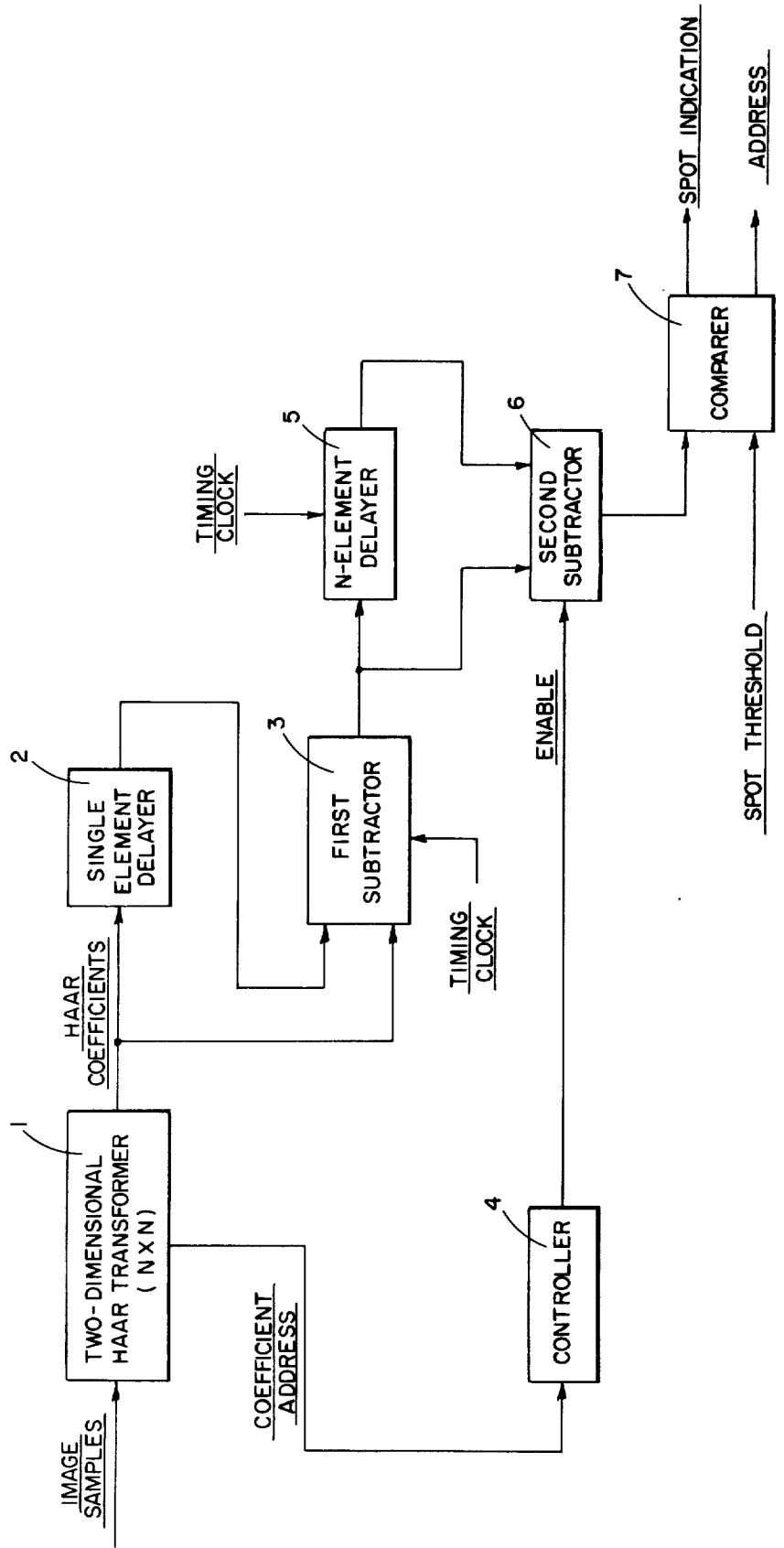

IMAGE SPOT DETECTOR USING HAAR COEFFICIENTS

BACKGROUND OF THE INVENTION

1. Field of the Invention

This invention pertains to digital processing machines for processing two-dimensional images. More particularly, this machine pertains to the detection of "spots" in video images where the images are transformed in two dimensions by means of the Haar transform and are represented in the transform domain by two-dimensional arrays of Haar transform coefficients.

2. Description of the Prior Art

Various systems have been developed to recognize specific images, see e.g. "Pattern Identifying Systems", U.S. Pat. No. 3,869,697; "Character Recognition Apparatus", U.S. Pat. No. 3,846,752; and "Pattern Recognition Apparatus", U.S. Pat. No. 3,597,731.

Other machines have been developed for detecting lines and edges utilizing the Hadamard transform, see e.g. "Pattern Recognition Machine for Analyzing Line Orientation", U.S. Pat. No. 4,005,385. A system has also been developed for recognizing corners when the outline of the object is defined as a series of points, see "Automatic Corner Recognition System", U.S. Pat. No. 3,576,980, and a system has been developed for recognizing image corners by examining certain corner sensitive transform coefficients in the transform domain after the two-dimensional image has been subjected to a two-dimensional Haar transformation, see U.S. Patent Application Ser. No. 069,883, for "Image Corner Detector Using Haar Coefficients", filed Aug. 27, 1979.

SUMMARY OF THE INVENTION

The invention described in this application operates in the Haar transform domain to detect image "spots", i.e., locally bright or dark areas in an image. Because the system of this invention operates in the Haar transform domain, it is suitable for use with more general image processing machines which also utilize the Haar transform. In the more general processing machine, the spots detected by this invention can be highlighted in a retransformation into the image domain or the location of the spots can be used in the more general processing machine to identify specific images by means of a library of image characteristics stored in the processing machine.

This invention Haar transforms, in two dimensions, digital data representing two-dimensional images. The invention then calculates the difference between each transform coefficient and the adjacent coefficient in the same row but in the immediately preceding column. It also calculates the corresponding difference between the pair of coefficients in the same and immediately preceding column, but in the preceding row, and then calculates the difference, referred to herein as the "double difference", between the differences already calculated for these two pairs of transform coefficients. Certain of these "double differences" are sensitive to spots. The absolute magnitudes of these double differences which are sensitive to spots are compared to a threshold and a spot indication is output whenever the absolute magnitude of the double difference exceeds the threshold. The threshold may be fixed at a value preselected by the operator or it may be automatically adjusted in an adaptive manner dependent upon the number of spots detected in previous sets of transform coefficients.

BRIEF DESCRIPTION OF THE DRAWING

FIG. 1 is a block diagram of the invention

DESCRIPTION OF THE PREFERRED EMBODIMENT

Referring now to FIG. 1. Digital data representing two-dimensional images is input to two-dimensional Haar transformer 1. The digital data may be in series or parallel form, but in either case the data is input as successive sets of data representing two-dimensional arrays of picture elements. In most applications, so that the memories within the invention can be modest in size, the two-dimensional array of picture elements represented by the digital data is a subset of the much larger two-dimensional image which is processed by the invention. Methods for obtaining successive two-dimensional subarrays from a much larger two-dimensional image are straightforward and well known. See e.g. my patent application Ser. No. 069,883, filed Aug. 27, 1979.

Each successive n x n array of digital data is transformed by two-dimensional Haar transformer 1 into an n x n array of transform coefficients. A two-dimensional transformer suitable for use in this application has been described in U.S. Pat. No. 3,981,443 and U.S. Pat. No. 4,189,748. Two-dimensional Haar transformer 1 outputs successive two-dimensional arrays of transform coefficients to single element delayer 2 and to first subtractor 3 and outputs the coefficient addresses to controller 4. The two-dimensional arrays of transform coefficients are output in serial form from two-dimensional Haar transformer 1. Single element delayer 2 delays or shifts the transform coefficients by one step or one transform coefficient and outputs this delayed coefficient to first subtractor 3 which subtracts each Haar transform coefficient from the transform coefficient immediately preceding it in the same row as indicated in FIG. 1. First subtractor 3 outputs the differences into n-element delayer 5 and into second subtractor 6. N-element delayer 5 shifts or delays the string of differences output by first subtractor 3 by the number of elements in one row of the n×n array to effectively shift the data by one row of transform coefficients. Second subtractor 6 then calculates the difference between the difference, which was output by first subtractor 3, and the difference, which was output n elements previously as the output from n-element delayer 5. This "double difference" is given by the equation:

$$\text{"double difference"}_{ij} = h_{ij} + h_{i-1,j-1} - h_{i-1,j} - h_{i,j-1}$$

where $h_{ij}$ is the Haar coefficient at row i and column j of the array of transform coefficients. The double difference is output by second subtractor 6 to comparer 7 only for those double differences for which second subtractor 6 receives an enabling signal from controller 4. Controller 4 contains a read only memory which lists those double differences that are sensitive to spots. Table 1 lists the transform coefficients in a 16×16 array for which the double difference is sensitive to spots. For other than 16×16 arrays, the addresses of the spot sensitive coefficients are given by:

"double difference"$_{i,j}$ is spot sensitive if $2^N-(2^{N-1}-2) \leq i \leq 2^N$ and $2^N-(2^{N-1}-2) \leq j \leq 2^N$ for any $N \geq 2$.

The double differences listed in Table 1 are sensitive to spots in the sense that they are large whenever the image contains a locally bright or dark area in the portion of the image to which the coefficient is sensitive. The picture elements, in a 16×16 array of picture elements, which lie in the areas of the image to which the respective transform coefficients are spot sensitive are listed in Table 2.

When enabled, the output of second subtractor 6 enters comparer 7 where the absolute magnitude of the double difference is compared to a preselected threshold. Whenever the absolute magnitude of the double difference exceeds the threshold, comparer 7 outputs a spot indication, together with the row and column address of the double difference.

The preset threshold in comparer 7 may be a fixed threshold preselected by the operator. However, in some applications, an adaptive threshold would be more useful. In such circumstances, the preferred embodiment would include provisions for an adaptive threshold. Patent application Ser. No. 069,883 describes an adaptive threshold appropriate for use in connection with this invention.

I claim:

1. A machine for processing successive n×n arrays of digital data, which data represents two-dimensional images, for the purpose of detecting image spots comprising:
   (a) two-dimensional Haar transformer means for Haar transforming the digital data in two dimensions into successive n×n arrays of transform coefficients,
   (b) single element delayer means for delaying, by one transform coefficient, the sequence of Haar transform coefficients output by said two-dimensional Haar transformer means,
   (c) first subtractor means for forming the difference between each transform coefficient output by two-dimensional Haar transformer means and each delayed transform coefficient output by said single element delayer means,
   (d) n-element delayer means for delaying the difference output by first subtractor means,
   (e) second subtractor means for forming the difference between each difference output by first subtractor means and each delayed difference output by n-element delayer means,
   (f) controller means for receiving the coefficient addresses output by two-dimensional Haar transformer means and outputting an enabling signal to second subtractor means for those double differences that are sensitive to spots, said second sub-

TABLE 1

|  | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 |  |  |  |  |  |  |  |  |  |  |  |  |  |  |  |  |
| 2 |  |  |  |  |  |  |  |  |  |  |  |  |  |  |  |  |
| 3 |  |  |  |  |  |  |  |  |  |  |  |  |  |  |  |  |
| 4 |  |  |  | X |  | X | X | X |  |  |  |  |  |  |  |  |
| 5 |  |  |  |  |  |  |  |  |  |  |  |  |  |  |  |  |
| 6 |  |  |  | X |  | X | X | X |  | X | X | X | X | X | X | X |
| 7 |  |  |  | X |  | X | X | X |  | X | X | X | X | X | X | X |
| 8 (Column J) |  |  |  | X |  | X | X | X |  | X | X | X | X | X | X | X |
| 9 |  |  |  |  |  |  |  |  |  |  |  |  |  |  |  |  |
| 10 |  |  |  |  |  | X | X | X |  | X | X | X | X | X | X | X |
| 11 |  |  |  |  |  | X | X | X |  | X | X | X | X | X | X | X |
| 12 |  |  |  |  |  | X | X | X |  | X | X | X | X | X | X | X |
| 13 |  |  |  |  |  | X | X | X |  | X | X | X | X | X | X | X |
| 14 |  |  |  |  |  | X | X | X |  | X | X | X | X | X | X | X |
| 15 |  |  |  |  |  | X | X | X |  | X | X | X | X | X | X | X |
| 16 |  |  |  |  |  | X | X | X |  | X | X | X | X | X | X | X |

X = Subtract Enable

TABLE 2

|  | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 |  |  |  |  |  |  |  |  |  |  |  |  |  |  |  |  |
| 2 |  |  |  |  |  |  |  |  |  |  |  |  |  |  |  |  |
| 3 |  |  |  |  |  |  |  |  |  |  |  |  |  |  |  |  |
| 4 (COLUMN ADDRESS OR SUBTRACT ENABLE) |  |  |  | 8,8 |  | 8,4 | 8,8 | 8,12 |  |  |  |  |  |  |  |  |
| 5 |  |  |  |  |  |  |  |  |  |  |  |  |  |  |  |  |
| 6 |  |  |  | 4,8 |  | 4,4 | 4,8 | 4,12 |  | 4,2 | 4,4 | 4,6 | 4,8 | 4,10 | 4,12 | 4,14 |
| 7 |  |  |  | 8,8 |  | 8,4 | 8,8 | 8,12 |  | 8,2 | . | . | . | . | . | 8,14 |
| 8 |  |  |  | 12,8 |  | 12,4 | 12,8 | 12,12 |  | 12,2 | 12,4 | 12,6 | 12,8 | 12,10 | 12,12 | 12,14 |
| 9 |  |  |  |  |  |  |  |  |  |  |  |  |  |  |  |  |
| 10 |  |  |  |  |  | 2,4 | 2,8 | 2,12 |  | 2,2 | 2,4 | 2,6 | 2,8 | 2,10 | 2,12 | 2,14 |
| 11 |  |  |  |  |  | 4,4 | . | 4,12 |  | 4,2 | . | . | . | . | . | 4,14 |
| 12 |  |  |  |  |  | 6,4 | . | 6,12 |  | 6,2 | . | . | . | . | . | 6,14 |
| 13 |  |  |  |  |  | 8,4 | . | 8,12 |  | 8,2 | . | . | . | . | . | 8,14 |
| 14 |  |  |  |  |  | 10,4 | . | 10,12 |  | 10,2 | . | . | . | . | . | 10,14 |
| 15 |  |  |  |  |  | 12,4 | . | 12,12 |  | 12,2 | . | . | . | . | . | 12,14 |
| 16 |  |  |  |  |  | 14,4 | 4,8 | 14,12 |  | 14,2 | 14,4 | 14,6 | 14,8 | 14,10 | 14,12 | 14,14 |

X, Y → ROW AND COLUMN ADDRESS OF SPOT
for an N × N matrix $N = 2^P$
A substract enable at i,j flags a spot at $(l-1)2^{P-r}$, $(m-1)2^{P-k}$
where $i = 2^r + l$; $1 \leq l \leq 2^r$
$j = 2^k + m$; $1 \leq m \leq 2^k$

. →ETC.

tractor means outputting a double difference only when enabled by controller means, and (g) comparer means containing a preselected threshold for comparing the output of said second subtractor means to the threshold and outputting a spot indication and its address whenever the absolute magnitude of the output of second subtractor means exceeds the threshold.

2. The machine described in claim 1 but wherein the preselected threshold is an adaptive threshold.

* * * * *